US010561219B2

(12) United States Patent
Hori

(10) Patent No.: US 10,561,219 B2
(45) Date of Patent: Feb. 18, 2020

(54) OBJECT HOLDING MEMBER AND DRAWING APPARATUS

(71) Applicant: CASIO COMPUTER CO., LTD., Shibuya-ku, Tokyo (JP)

(72) Inventor: Masahiro Hori, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 315 days.

(21) Appl. No.: 15/674,444

(22) Filed: Aug. 10, 2017

(65) Prior Publication Data

US 2018/0084889 A1 Mar. 29, 2018

(30) Foreign Application Priority Data

Sep. 27, 2016 (JP) ................. 2016-187749

(51) Int. Cl.
| | |
|---|---|
| *G06K 15/22* | (2006.01) |
| *A45D 29/22* | (2006.01) |
| *B41J 3/407* | (2006.01) |
| *B41J 11/58* | (2006.01) |
| *A45D 29/00* | (2006.01) |

(52) U.S. Cl.
CPC ............ *A45D 29/22* (2013.01); *B41J 3/4073* (2013.01); *B41J 11/58* (2013.01); *G06K 15/22* (2013.01); *A45D 2029/005* (2013.01)

(58) Field of Classification Search
None
See application file for complete search history.

(56) References Cited

U.S. PATENT DOCUMENTS

| | | | | |
|---|---|---|---|---|
| 5,130,553 A | * | 7/1992 | Amoh ................... | A45D 31/00 132/73.5 |
| 5,282,276 A | * | 2/1994 | Preiose ................. | A45D 29/00 132/73 |
| 5,743,277 A | * | 4/1998 | Moreshead ........... | A45D 31/00 132/200 |
| 6,035,860 A | * | 3/2000 | Mombourquette .... | A45D 29/00 132/200 |
| 6,286,517 B1 | | 9/2001 | Weber et al. | |
| 6,336,694 B1 | | 1/2002 | Ishizaka | |
| 6,461,305 B1 | | 10/2002 | Schnall | |
| 6,916,289 B2 | | 7/2005 | Schnall | |
| 8,863,758 B1 | * | 10/2014 | Walenciak ............ | A45D 29/02 132/73.5 |
| 9,712,727 B2 | | 7/2017 | Yamasaki | |
| 2002/0072681 A1 | | 6/2002 | Schnali | |

(Continued)

FOREIGN PATENT DOCUMENTS

| | | |
|---|---|---|
| JP | 10198785 A | 7/1998 |
| JP | 2001070264 A | 3/2001 |

(Continued)

*Primary Examiner* — Ted W Barnes
(74) *Attorney, Agent, or Firm* — Holtz, Holtz & Volek PC

(57) ABSTRACT

An object holding member, which is to be disposed in an external apparatus, includes an object insertion tool, and a connector. The object insertion tool has a space, into which an object which is a finger or a toe having a nail is inserted. The connector is configured to couple with the external apparatus and suppress a change in a position of the object holding member within the external apparatus in a case where the object holding member is disposed in the external apparatus.

18 Claims, 6 Drawing Sheets

(56) References Cited

U.S. PATENT DOCUMENTS

| | | |
|---|---|---|
| 2005/0187438 A1 | 8/2005 | Xie |
| 2007/0027373 A1 | 2/2007 | Xie |
| 2007/0092634 A1 | 4/2007 | Zhang |
| 2012/0113171 A1* | 5/2012 | Murata .................... B41J 3/407 347/2 |
| 2014/0107697 A1 | 4/2014 | Patani et al. |
| 2015/0374093 A1* | 12/2015 | Ankrum ................. A45D 29/04 132/73.5 |
| 2016/0174680 A1* | 6/2016 | Yamasaki ................ B41J 3/407 132/200 |
| 2016/0367011 A1* | 12/2016 | Hori ....................... A45D 29/00 |
| 2017/0367459 A1* | 12/2017 | Yamasaki .............. A45D 29/22 |

FOREIGN PATENT DOCUMENTS

| | | | |
|---|---|---|---|
| JP | 2002517270 A | | 6/2002 |
| JP | 3370345 B2 | | 1/2003 |
| JP | 2003534083 A | | 11/2003 |
| JP | 2005192669 A | * | 7/2005 |
| JP | 2005192669 A | | 7/2005 |
| JP | 2012152410 A | | 8/2012 |
| JP | 2014138887 A | | 7/2014 |

* cited by examiner

OBJECT HOLDING MEMBER AND DRAWING APPARATUS

CROSS-REFERENCE TO RELATED APPLICATIONS

The present invention contains subject matter related to Japanese Patent Application No. 2016-187749 filed in the Japanese Patent Office on Sep. 27, 2016, the entire contents of which are incorporated herein by reference.

BACKGROUND OF THE INVENTION

1. Field of the Invention

The present invention relates to an object holding member and a drawing apparatus.

2. Description of the Related Art

Conventionally, drawing apparatuses for drawing nail designs on nails are known.

However, in cases where a finger of a nail on which a drawing is to be performed is simply placed on a mounting stand, the hand of that finger is in an unstable state. As such, the finger may move during the drawing, resulting in deviation of the drawing position and, as a result, the finish of the nail printing may not be beautiful.

The Beautician's Act and Barber's Act stipulate safety standards and hygiene standards for services performed by beauticians and barbers. For example, in situations when multiple users use a nail printing apparatus in a nail salon or the like and the finger and/or nail of each user directly contacts the interior of the nail printing apparatus, the interior of the apparatus must be cleaned and disinfected for each user.

On this point, techniques have been proposed for preventing overflow and spattering of ink. In such techniques, when a user performs nail printing on their own, the user places a finger-sheath type nail auxiliary implement formed from thin rubber on the finger of the drawing object, namely the nail. An example of this technique is described in Japanese Unexamined Patent Application Publication No. 2005-192669.

If drawing is performed on the nail while such a finger-sheath type nail auxiliary implement is placed on the finger, the finger and/or nail of the user will not directly contact the interior of the apparatus. As such, the labor involved with cleaning and disinfecting the interior of the apparatus for each user can be omitted and hygienic and safe nail printing can be performed.

However, with a configuration such as the finger-sheath type nail auxiliary implement described in the aforementioned publication, in which the nail auxiliary implement is mounted on the finger by simply inserting the fingertip of the finger into the nail auxiliary implement, the nail may contact and rub against the finger sheath and the nail print applied to the nail may be damaged when putting the nail auxiliary implement on the finger and removing the nail auxiliary implement from the finger.

In cases where a user performs nail printing on a nail on their own without using a nail printing apparatus or the like, there is no particular need to consider matters such as the positioning or holding of the finger. However, in cases where the finger is set in a nail printing apparatus and drawing is performed using a pen and/or ink jet head, precise positioning and prevention of positional deviation of the finger (nail of the finger) during drawing is necessary to prevent deviation of the drawing position.

On this point, the nail auxiliary implement described in the aforementioned publication is intended for use in cases where a user performs nail printing on a nail on their own, and is not an implement for holding the finger, nor is it an implement for positioning and preventing positional deviation of the finger.

BRIEF SUMMARY OF THE INVENTION

According to one embodiment, an object holding member and a drawing apparatus can be provided whereby positioning and holding of a nail of an object being a finger or a toe, can be performed in a simple and reliable manner.

An object holding member of the present invention whereby the advantageous effects described above can be obtained includes an object insertion tool and a connector, wherein the object holding member is disposed within an external apparatus; the object insertion tool has a space, into which an object being a finger or a toe having a nail, is inserted; and the connector is configured to couple with the external apparatus and suppress a change in a position of the object holding member within the external apparatus, in a case where the object holding member is disposed in the external apparatus.

A drawing apparatus of the present invention whereby the advantageous effects described above can be obtained includes, an object holding member including a connector and an object insertion tool, the object insertion tool having a space, into which an object being a finger or a toe having a nail, is inserted; an object receiver in which the object holding member is disposed; and a drawing mechanism configured to perform a drawing on the nail of the object inserted into the object holding member disposed within the object receiver, wherein the object receiver includes an apparatus side connector configured to couple with the connector and suppress a change in a position of the object holding member within the object receiver, in a case where the object holding member is disposed in the object receiver.

DETAILED DESCRIPTION OF THE INVENTION

Figure 1A:
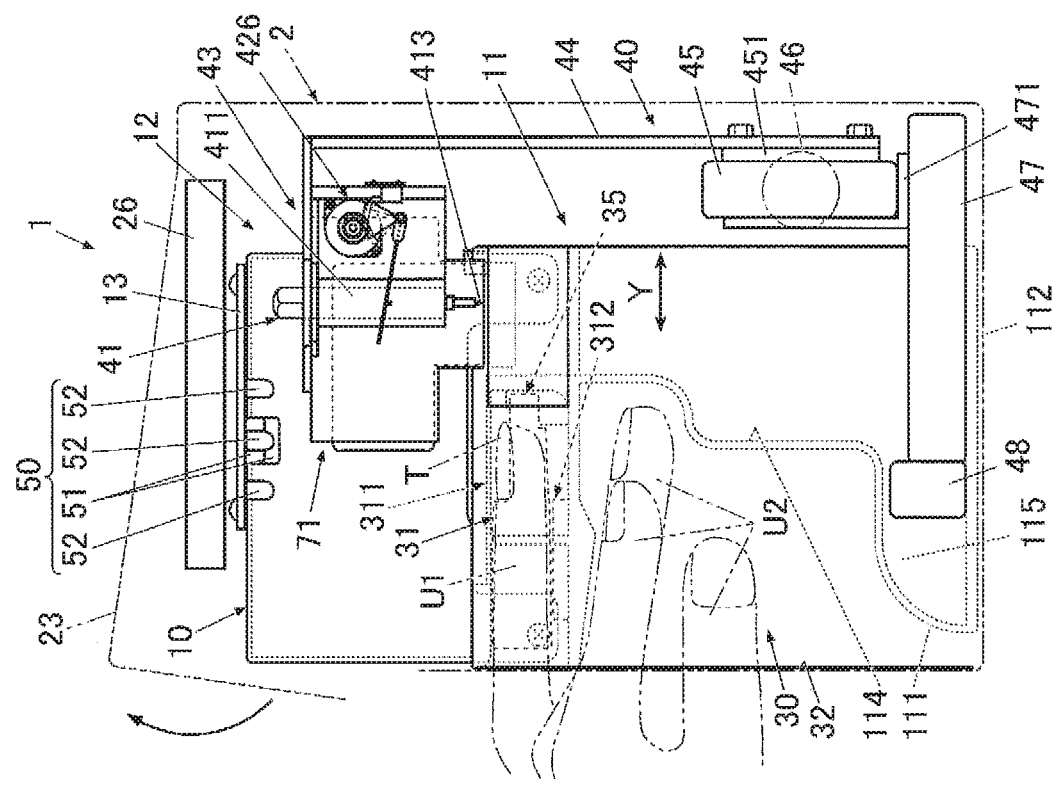
FIG. 1A is a front view of a drawing apparatus according to an embodiment of the present invention.

An embodiment of a finger holding member and a nail printing apparatus (drawing apparatus) according to the present invention is described below in detail while referring to the drawings.

While various limitations, which are technically preferable from the perspective of carrying out the present invention, are placed on the embodiment described below, the scope of the present invention should not be construed to be limited to the embodiment or the examples illustrated in the drawings.

In the following embodiment, a nail printing apparatus 1 will be described as an apparatus for drawing on a drawing object, namely a fingernail. However, the drawing object of the present invention is not limited to a fingernail, and for example, the drawing object may be a toenail.

FIG. 1A is a front view illustrating an internal configuration of the nail printing apparatus.

Figure 1B:
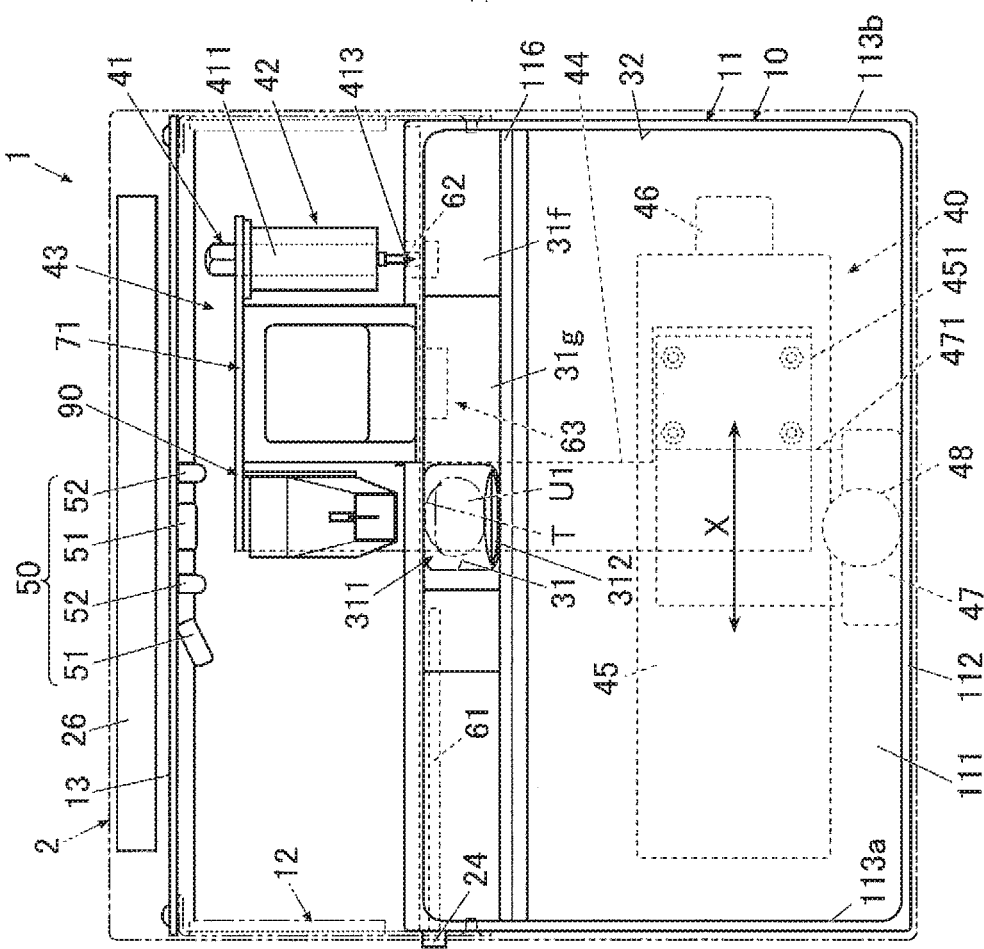
FIG. 1B is a side view illustrating an internal configuration of the drawing apparatus illustrated in FIG. 1A.

FIG. 1B is a side view illustrating the internal configuration of the drawing apparatus illustrated in FIG. 1A.

As illustrated in FIGS. 1A and 1B, in the nail printing apparatus 1 of the present embodiment, a drawing head 43 is provided with drawing tools, namely a pen 41, and an ink jet head 71. The nail printing apparatus 1 of the present embodiment uses plotter printing and ink jet printing to perform a drawing on a nail T.

The nail printing apparatus 1 is provided with a case body 2 and an apparatus main body 10 housed in the case body 2.

A finger holding member (an object holding member) 35 of the present embodiment (see FIG. 3) is mounted on a drawing object, namely a finger (a print finger U1) having the nail T, when a drawing is to be performed on the nail T of the print finger U1 by a nail printing apparatus (a drawing apparatus) 1 such as that illustrated in FIGS. 1A and 1B.

Then, the finger holding member 35 is disposed within a finger receiver (an object receiver) 31 of an external apparatus, namely the nail printing apparatus (the drawing apparatus) 1, while mounted on the print finger U1.

As illustrated in FIG. 1B, a cover 23, configured to be openable and closeable, for replacing the pen 41 and the ink jet head 71 of a drawing mechanism 40 (described later) is provided on the case body 2 from an upper surface thereof to an upper area front surface.

The cover 23 is rotatable via, for example, a hinge or the like, from a closed state to an open state, as illustrated in FIG. 1B.

An operation device 25 (see FIG. 4) is set on an upper surface (a top panel) of the case body 2.

The operation device 25 is an input part where a user performs various types of input.

Operation buttons (not illustrated) for performing various types of input are set in the operation device 25. Examples of the operation buttons include a power switch button for turning on the power of the nail printing apparatus 1, a stop switch button for stopping operation, a design selection button for selecting a design image to be drawn on the nail T, a drawing start button for commanding the drawing to start, and the like.

A display 26 is set approximately in a center area of the top surface (the top panel) of the case body 2.

The display 26 is configured from, for example, a liquid crystal display (LCD), an organic electroluminescence display, or other type of flat display.

In the present embodiment, examples of images appropriately displayed on the display 26 include nail images obtained by imaging the print finger U1 (finger images including images of the nail T), images of the outline or the like of the nail T included in the nail images, design selection images for selecting a design image to be drawn on the nail T, thumbnail images for design confirmation, command screens displaying various commands, and the like.

Note that a configuration is possible in which a touch panel for performing various types of input is integrated into the surface of the display 26.

The apparatus main body 10 is formed into a rough box-shape and is provided with a lower frame 11 set in the lower area of the interior of the case body 2, and an upper frame 12 set above the lower frame 11 and in the upper area of the interior of the case body 2.

First, the lower frame 11 will be described.

The lower frame 11 has a back surface plate 111, a bottom plate 112, a pair of left and right side plates 113a and 113b, an X-direction movement stage housing 114, a Y-direction movement stage housing 115, and a dividing wall 116.

Bottom edges of the side plates 113a and 113b are joined respectively to left and right edges of the bottom plate 112. The side plates 113a and 113b are provided in an upright state on the bottom plate 112.

A lower area of the back surface plate 111 is formed so as to sink forward (toward the finger insertion direction proximal side) in two stages. The bottom edge of the back surface plate 111 is joined to a front edge of the bottom plate 112, and the back surface plate 111 divides the area surrounded by the bottom plate 112 and the side plates 113a and 113b into front and back.

The space formed on the back side of the sunken back surface plate 111 becomes the X-direction movement stage housing 114 and the Y-direction movement stage housing 115 (see FIG. 1B).

An X-direction movement stage 45 of the drawing mechanism 40 is housed in the X-direction movement stage housing 114 when the drawing mechanism 40 is moved forward (toward the finger insertion direction proximal side).

A Y-direction movement stage 47 of the drawing mechanism 40 is disposed in the Y-direction movement stage housing 115.

The dividing wall 116 is provided inside the lower frame 11 so as to vertically divide the space on the front side inside the lower frame 11 (the space on the finger insertion direction proximal side surrounded by the back surface plate 111, the bottom plate 112, and the side plates 113a and 113b).

The dividing wall 116 is provided roughly horizontally, left and right edges of the dividing wall 116 are joined respectively to the side plates 113a and 113b, and a back edge of the dividing wall 116 is joined to the back surface plate 111.

A finger holding portion (an object holding portion; see FIG. 1B) 30 is provided integrally in the lower frame 11.

The finger holding portion 30 is configured from a finger receiver (an object receiver) 31 for receiving the finger corresponding to the nail T (i.e. the drawing object) on which drawing will be performed (hereinafter referred to as "print finger U1"), and a finger resting space (an object resting space) 32 for resting fingers other than the print finger U1 (hereinafter referred to as "non-print fingers U2").

The finger receiver 31 is disposed on an upper side of the dividing wall 116 and, for example, at roughly the center in a width direction of the lower frame 11.

The space on the lower side of the lower frame 11, partitioned by the dividing wall 116, forms the finger resting space 32.

For example, in cases where performing a drawing on the nail T of a ring finger, the ring finger is inserted into the finger receiver 31 as the print finger U1, and the non-print fingers U2, namely the other four fingers (thumb, index finger, middle finger, and little finger) are inserted into the finger resting space 32.

A user can pinch the dividing wall 116 between the print finger U1 inserted in the finger receiver 31 and the non-print fingers U2 inserted in the finger resting space 32. Thus, the print finger U1 inserted in the finger receiver 31 is stably fixed.

A front wall 31f (see FIG. 1A) that closes the front surface side of the lower frame 11 is provided on the top surface of the dividing wall 116, at both end areas on the front surface side of the lower frame 11.

A pair of guide walls 31g (see FIG. 1A) that guides the print finger U1 into the finger receiver 31 is erected on the top surface of the dividing wall 116, and the pair of guide walls 31g narrows from the end of the front wall 31f on the center area side toward the finger receiver 31.

Figure 2:
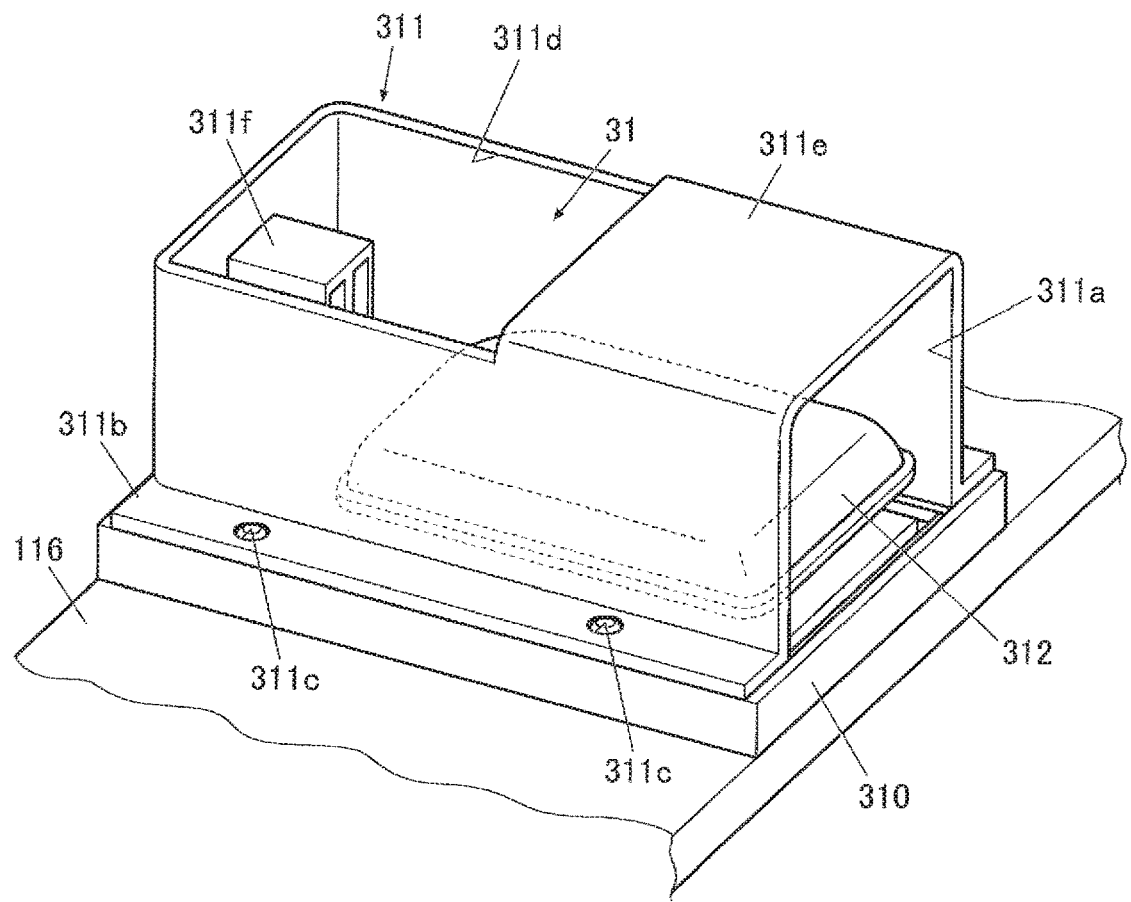
FIG. 2 is a main constituent perspective view of a finger receiver in the embodiment of the present invention.

FIG. 2 is a perspective view of the finger receiver 31 in the present embodiment.

As illustrated in FIG. 2, the finger receiver 31 includes a finger mount portion (object mount portion) 310 constituted by a portion of the dividing wall 116. The finger mount portion 310 is where a finger of the nail T (the print finger U1) on which the drawing is to be performed is mounted on the X-Y plane. The finger receiver 31 also includes a finger holding case (an object holding case) 311 fixed to the top of the finger mount portion 310.

The finger holding case 311 is a substantially box-shaped member of which a side attached to the dividing wall 116, namely a bottom side, is open.

As illustrated in FIG. 2, outward facing flanges 311b are formed on the finger holding case 311 of the present embodiment, along the peripheral edge of the opening on the bottom side.

Screw holes 311c are formed at two locations in each outward facing flange area 311b, on both sides of the finger holding case 311.

The finger holding case 311 is fixed to the finger mount portion 310 by screwing screws (not illustrated) through the screw holes 311c in the outward facing flange areas 311b.

A side disposed on an apparatus front face side (proximal side in the print finger insertion direction) of the finger holding case 311 is also open. The side of the finger holding case 311 disposed on the apparatus front face side constitutes a finger insertion opening 311a through which the print finger U1 is inserted.

The top surface and back side in the print finger insertion direction of the finger holding case 311 is configured as a window area 311d for exposing the nail T of the print finger U1 inserted into the finger receiver 31.

The top surface and front side in the print finger insertion direction of the finger holding case 311 is configured as a finger holding portion (an object holding portion) 311e that prevents the height of the print finger U1 from becoming too high.

The finger holding portion 311e may be a simple plate-like member, or may be a cushioning material or the like that is formed from resin or the like and provided at a portion (that is, a face on the inner side of the finger holding case 311) against which the top side of the print finger U1 abuts. Providing this cushioning material or the like on the face of the inner side of the finger holding portion 311e is preferable because impact and pain will not be as likely to be felt when the print finger U1 is pressed up and strikes the finger holding portion 311e.

An apparatus side connector 311f is provided on the back side in the print finger insertion direction of the finger receiver 31, that is, on the back side of the finger holding case 311.

The apparatus side connector 311f is formed in a shape that corresponds to the shape of a connector 352 of the finger holding member 35. The apparatus side connector 311f couples with the connector 352 of the finger holding member 35 when the finger holding member 35 having the print finger U1 inserted thereto is inserted into the finger receiver 31.

The apparatus side connector 311f suppresses a change in a position of the finger holding member 35 within the finger receiver 31 at a time of drawing by coupling with the connector 352 of the finger holding member 35.

The apparatus side connector 311f is formed with a size (height) such that, when coupled with the connector 352, the nail T is exposed through the window area 311d, and the nail T is disposed at a drawable position, where drawing by the pen 41 and the ink jet head 71 of the drawing mechanism 40 (described later) can be appropriately performed on the nail T.

In the present embodiment, the connector 352 (described later) has a substantially U-shaped cross-sectional shape. The apparatus side connector 311f is formed slightly smaller than the connector 352 and has a rectangular cross-sectional shape.

In the present embodiment, the connector 352 is disposed so as to cover the top of the apparatus side connector 311f, thereby coupling the connector 352 with the apparatus side connector 311f.

Note that the shape of the apparatus side connector 311f is not limited to the shape illustrated in FIG. 2 and may be any shape, provided that the connector couples easily with the connector 352 when the finger holding member 35 is disposed in the finger receiver 31. Specifically, any configuration is possible provided that the inner shape and size of the connector 352 are substantially the same as the outer shape and size of the apparatus side connector 311f, and the connector 352 has a shape that mates with the apparatus side connector 311f.

For example, the apparatus side connector 311f may have a semi-circular cross-sectional shape with curved corners. In this case, it is preferable that the connector 352 have a shape that conforms to this semi-circular cross-sectional shape.

The apparatus side connector 311f may be provided integrally with the finger holding case 311.

The apparatus side connector 311f may, for example, be a member formed from rubber or any type of synthetic resin or the like as a separate member from the finger holding case 311. For example, the apparatus side connector 311f may be a member that is fixed to the back side of the finger holding case 311 using an adhesive or the like.

A finger fixing member (an object fixing member) 312 that prevents the print finger U1 from moving via the finger holding member 35 is disposed within the finger receiver 31 of the present embodiment.

The finger fixing member 312 of the present embodiment is configured to be expandable and contractable by changing the internal pressure thereof and prevents the print finger U1 from moving within the finger receiver 31 via the finger holding member 35 when in an expanded state.

The finger fixing member 312 is a bag-like member formed from a material that has a certain degree of elasticity and pliability such as, for example, a sheet of elastomer, silicone, urethane resin, or the like.

Note that the material of the finger fixing member 312 is not particularly limited and any material can be used, provided that the print finger U1 is pressed up to a position where the top side of the finger holding member 35 contacts the bottom surface of the finger holding portion 311e when the finger fixing member 312 is in the expanded state, which is attained by injecting a fluid such as air or the like so as to raise the internal pressure; and the material can contract to a size that does not inhibit the insertion into or removal from the finger receiver 31 of the finger holding member 35 when the finger fixing member 312 is in the contracted state, which is attained by discharging the fluid such as air or the like so as to lower the internal pressure.

Note that it is preferable that the finger fixing member 312 be formed from an elastomer or the like because, in this case, suitable frictional forces between the finger fixing member 312 and the finger holding member 35 (described later) can be obtained, and positional deviation can be suppressed in cases where the print finger U1 is mounted on the finger fixing member 312 while being held by the finger holding member 35.

Note that the shape, size, disposal range, and the like of the finger fixing member 312 are not limited to the examples illustrated in the drawings.

For example, in the present embodiment, as illustrated in FIG. 2, the finger fixing member 312 is only provided from the front side of the finger receiver 31 to roughly the cuticle of the nail T and is not provided up to the tip portion of the finger. However, the finger fixing member 312 may be provided farther toward the back side. Note that, in cases where the finger fixing member 312 is provided up to the tip portion of the finger such as the lower portion of the nail T, when the finger fixing member 312 is expanded, the tip portion of the finger may be pressed up to a position that is too high to perform the drawing, and may protrude out through the window area 311d. As such, in cases of providing the finger fixing member 312 up to the tip portion of the finger, it is preferable that a configuration be provided in which, for example, the degree of expansion of the portion corresponding to the tip portion of the finger is adjusted (e.g. the degree of expansion is reduced) so as to prevent the tip portion of the print finger U1 from being lifted excessively upward by the finger fixing member 312.

A pump 313 (see FIG. 4) that injects the fluid (that is, for example, a gas such as air or a liquid such as water; in the present embodiment, an example is described below of a case in which the fluid is air) into the interior of the finger fixing member 312 via a communicating tube (not illustrated) is connected to the finger fixing member 312.

A valve 314 (see FIG. 4) for adjusting the inflow and outflow of the fluid, and a sensor 315 (see FIG. 4) capable of detecting the internal pressure of the finger fixing member 312 are provided between the finger fixing member 312 and the pump 313.

In the present embodiment, as described later, the size of the print finger U1 inserted into the finger receiver 31 is detected by a size detector 813 (see FIG. 4); and a pressure adjuster 814 (see FIG. 4) adjusts the internal pressure of the finger fixing member 312 at the time of holding the print finger U1, in accordance with the detected size of the print finger U1. The pump 313, the valve 314, and the sensor 315 are connected to the pressure adjuster 814, which controls the operations thereof.

Figure 3:
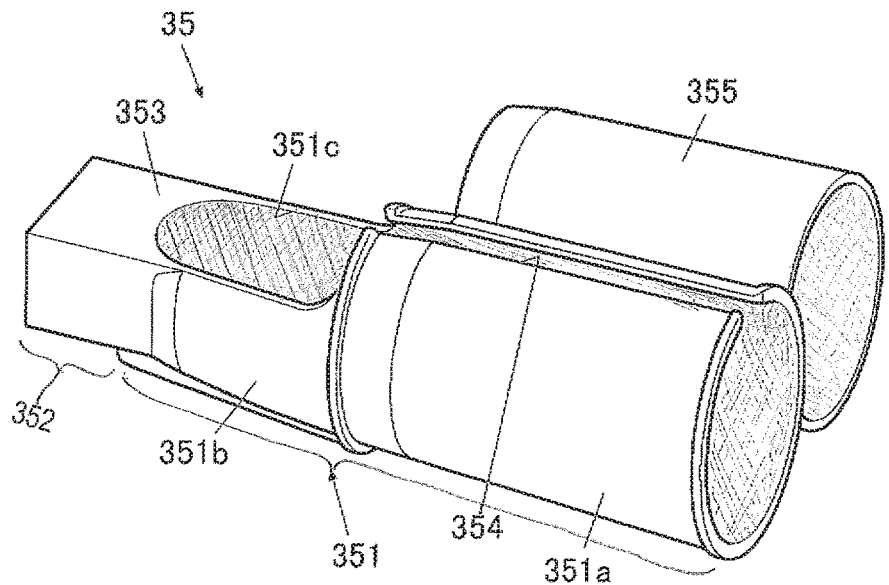
FIG. 3 is a perspective view of a finger holding member in the embodiment of the present invention.

FIG. 3 is a perspective view of the finger holding member that is inserted into the finger receiver 31.

As illustrated in FIG. 3, in the present embodiment, the finger holding member 35 includes a finger insertion tool (an object insertion tool) 351, and a connector 352 that couples with the apparatus side connector 311f of the external apparatus.

In the present embodiment, the finger holding member 35 also includes a nail mount portion 353 on which the nail T of the print finger U1, which is inserted into the finger insertion tool 351, is mounted.

It is preferable that the finger holding member 35 be formed from a soft material against which at least the finger insertion tool 351 has an appropriate degree of frictional force.

In the present embodiment, the finger insertion tool 351, the connector 352, and the nail mount portion 353 are integrally formed from a soft elastomer. Note that, the material of the finger holding member 35 is not particularly limited to an elastomer and any material can be used, provided that the material has a degree of softness. Examples thereof include silicone and the like.

As described above, it is preferable that the finger fixing member 312 be formed from an elastomer or the like because, in this case, suitable frictional forces with the finger fixing member 312 can be obtained due to the finger holding member 35 being formed from a similar material, and positional deviation can be suppressed in cases where the print finger U1 is mounted on the finger fixing member 312 while being held by the finger holding member 35.

The finger insertion tool 351 has a substantially cylindrical shape having a length and width that are the length and width expected of a typical finger. The finger insertion tool 351 is constituted by a first insertion portion 351a disposed on the base side of the finger and a second insertion portion 351b positioned closer to the finger tip side than the first insertion portion 351a when a finger is inserted.

A slit 354 that extends along a length direction of the finger insertion tool 351 is formed in a portion of a peripheral surface of the first insertion portion 351a. The length direction is along an insertion direction of the finger to the finger insertion tool 351. The finger insertion tool 351 is configured such that a finger can be inserted through the slit 354.

The position where the slit 354 is formed is not particularly limited but, in the present embodiment, the slit 354 is formed in the surface that is the top side when inserting a finger.

Figure 5A:
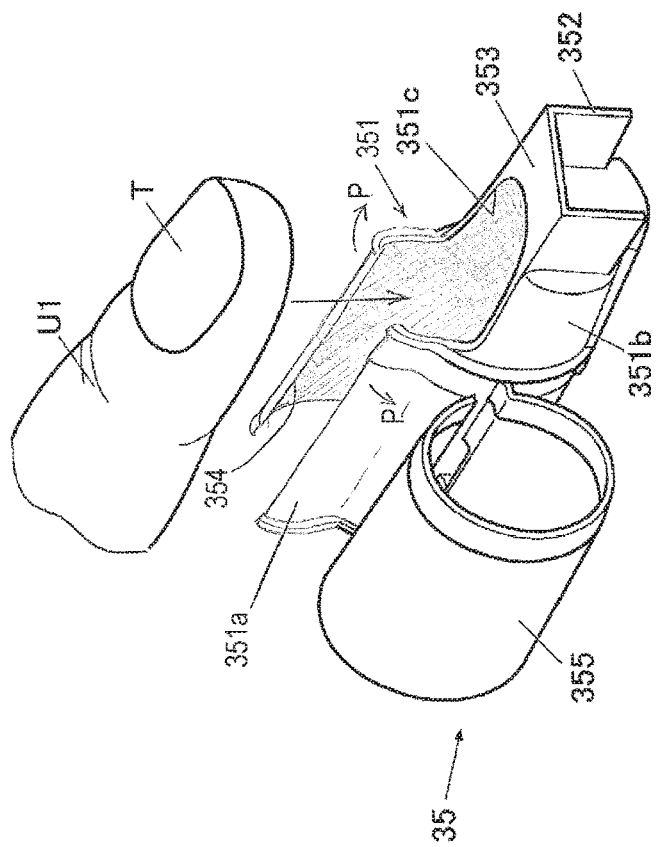
FIGS. 5A and 5B are perspective views illustrating a situation of inserting a print finger into the finger holding member.
Figure 5B:
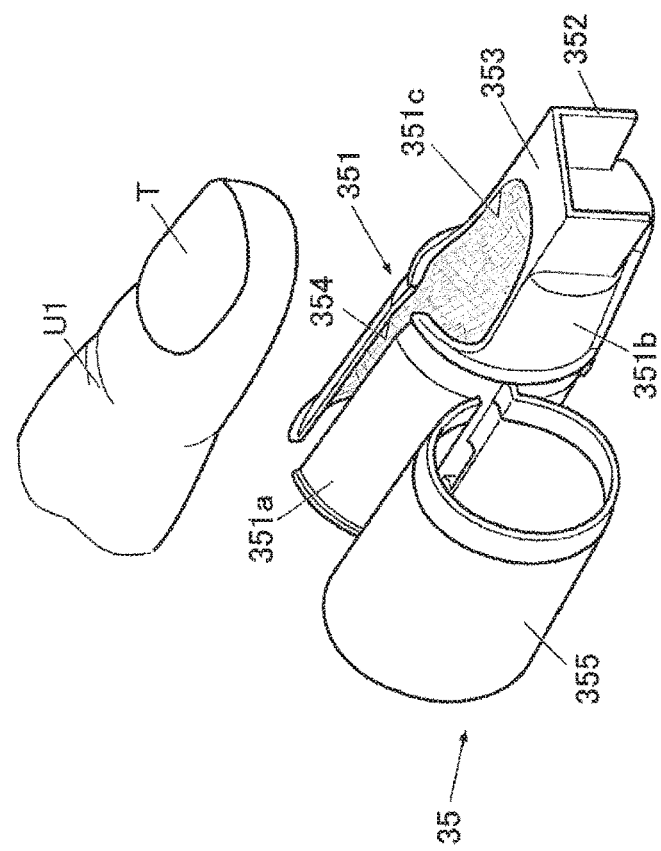

To insert the print finger U1 into the finger holding member 35, the user spreads the portion of the slit 354 on the top side of the finger holding member 35 outward, in the direction of the arrows P as illustrated in FIG. 5B, a degree whereby it is possible to insert the print finger U1 from the ventral side of the finger, and inserts the print finger U1 into the finger insertion tool 351.

Thus, the print finger U1 can be inserted and removed through the slit 354 on the top side of the finger insertion tool 351. As a result, the nail T does not contact the finger holding member 35 when inserting and removing the print finger U1 and rubbing and damaging of the nail print that has been performed on the nail T can be prevented.

The second insertion portion 351b is provided continuously more to the fingertip side than the first insertion portion 351a and, when the print finger U1 is inserted, the tip portion of the finger including the nail T is disposed in the second insertion portion 351b.

An opening region 351c for exposing the nail T is formed in the surface of the top side of the second insertion portion 351b. The slit 354 leads from a first end side of the first insertion portion 351a to the opening region 351c of the second insertion portion 351b.

In order to accommodate nails T of various shapes and sizes, it is preferable that the opening region 351c be formed slightly larger than a typically sized nail T.

The connector 352 couples with the apparatus side connector 311f of the external apparatus, namely the nail printing apparatus 1 and, as a result, the nail T of the print finger U1 is positioned in the external apparatus, namely the nail printing apparatus 1, via the finger holding member 35.

In the present embodiment, the connector 352 is provided continuously with the fingertip side of the finger insertion tool 351.

As described above, the apparatus side connector 311f in the present embodiment has a rectangular cross-sectional shape, and the connector 352 has a U-shaped cross-sectional shape capable of mating with the apparatus side connector 311f from above.

Note that a configuration is possible in which the strength and/or hardness of the connector 352 is increased such that the thickness of the connector 352 is greater than the thickness of the finger insertion tool 351.

In the present embodiment, the top surface of the connector 352, that is, the portion of the connector 352 near the opening region 351c is the nail mount portion 353 on which the nail T (particularly the free edge portion of the nail T) of the print finger U1, which is inserted into the finger insertion tool 351, is mounted.

In the present embodiment, the connector 352 is coupled with the apparatus side connector 311f by being fitted thereon. As such, the nail T, which is inserted into the finger insertion tool 351, exposed through the opening region 351c, and for which at least the free edge portion thereof is mounted on the nail mount portion 353, is positioned at a position that is suitable for drawing.

The finger holding member 35 of the present embodiment includes a belt member 355 that wraps along the outer periphery of the finger insertion tool 351 after the print finger U1 has been inserted, and closes the slit 354.

It is preferable that the belt member 355 be formed from a soft material, similar to that of the finger insertion tool 351 and the like. In the present embodiment, the belt member 355 is integrally formed with the outside of the finger insertion tool 351, and is formed from the same soft elastomer as used for the finger insertion tool 351 and the like.

Figure 6:
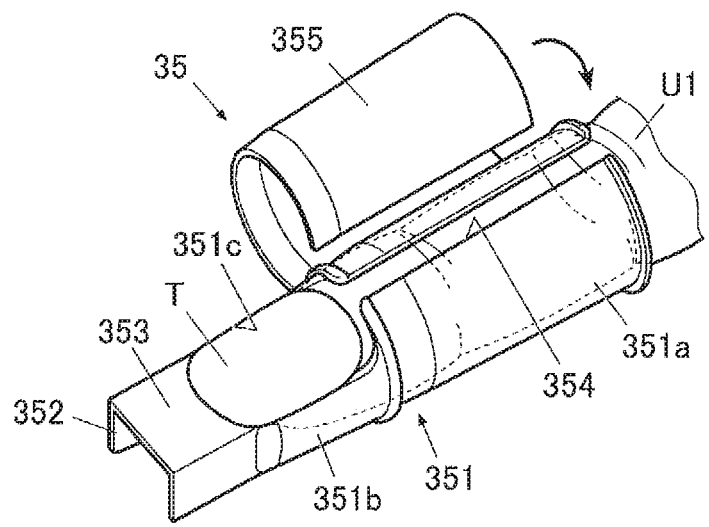
FIG. 6 is a perspective view illustrating a situation of wrapping a belt member on a finger insertion tool in which the print finger has been inserted.

As illustrated in FIGS. 5A, 5B, 6, and the like, it is preferable that the belt member 355 be curled so as to correspond with the outer periphery of the finger insertion tool 351. As a result of such a configuration, the belt member 355 will more easily wrap on the outer periphery of the finger insertion tool 351 and, furthermore, the wrapped belt member 355 will wrap firmly on the outer periphery of the finger insertion tool 351 and be less likely to detach.

It is preferable that the connection portion of the belt member 355 with the outer peripheral surface of the finger insertion tool 351 be bent in a direction in which the belt member 355 separates from the outer peripheral surface of the finger insertion tool 351. With such a configuration, the belt member 355 will not obstruct finger insertion when inserting the print finger U1 into the finger insertion tool 351, and insertion and removal of the print finger U1 into and from the finger insertion tool 351 can be performed smoothly.

It is preferable that an inside surface of the belt member 355 is subjected to surface roughening or the like in order to increase frictional resistance and reduce the likelihood of the belt member 355 slipping when wrapped on the outer periphery of the finger insertion tool 351.

Note that, in this case, the likelihood of the belt member 355 slipping may be further reduced by subjecting the outer peripheral surface of the finger insertion tool 351 to similar processing.

Note that the configuration for reducing the likelihood of the belt member 355 becoming displaced is not limited to the examples described herein. For example, a configuration is possible in which hooks or similar locking members that engage with each other are provided on the outer peripheral surface of the finger insertion tool 351 and the inside surface or free edge side of the belt member 355.

A test drawing area 61 is provided on the top surface of the lower frame 11, beside the finger receiver 31 (location corresponding to a media access port 24 of the case body 2, on the left side in FIG. 1A). The test drawing area 61 is for warming up a pen tip (tip portion) 413 within a drawable area of the drawing head 43 (described later) by performing test drawing with the pen 41 to eliminate fading and the like at a time of beginning of drawing of the pen 41.

The test drawing area 61 is configured so that flat drawing media inserted through the media access port 24 of the case body 2 is mounted thereon.

The drawing media mounted on the test drawing area 61 is not limited, provided that test drawing by the pen tip (tip portion) 413 can be performed and the pen tip 413 can be warmed up and, for example, may be a piece of paper.

A pen cap 62 is disposed within a movable range of the drawing head 43 (described later) on the top surface of the lower frame 11, on a side opposite the test drawing area 61 across the finger receiver 31 (in the present embodiment, the right side in FIG. 1A). The number of the pen cap 62 disposed (one in the present embodiment) corresponds to the number of a pen holder 42 (described later).

The pen cap 62 is formed, for example, from rubber. The nail printing apparatus 1 is configured such that, at times when the pen 41 is mounted on the drawing mechanism 40 but not drawing (when not drawing), drying out of the pen tip 413 is prevented by lowering the pen 41 and storing the pen tip 413 in the pen cap 62.

An ink jet maintenance device 63 is provided at a position corresponding to a position where the ink jet head 71 is disposed when the pen tip 413 is stored in the pen cap 62.

The ink jet maintenance device 63 is configured from, for example, a cleaning mechanism for cleaning an ink discharging area (nozzle surface) of the ink jet head 71 (described later), a cap mechanism for maintaining moist conditions of the ink discharging area (nozzle surface), and the like (all not illustrated).

Note that the disposal of the pen cap 62, the ink jet maintenance device 63, and the like is not limited to the examples described herein.

The drawing mechanism 40 is configured from and provided with the drawing head 43, a unit supporting member 44 that supports the drawing head 43, the X-direction movement stage 45 for moving the drawing head 43 in the X direction (the X direction in FIG. 1A; the left-right direction of the drawing apparatus 1), an X-direction movement motor 46, the Y-direction movement stage 47 for moving the drawing head 43 in the Y direction (the Y direction in FIG. 1B; the front-back direction of the drawing apparatus 1), a Y-direction movement motor 48, and the like.

As illustrated in FIGS. 1A and 1B, in the drawing head 43 of the present embodiment, the pen holder 42 holding the pen 41 and an ink jet holder 72 holding the ink jet head 71 are disposed adjacent to each other.

The ink jet head 71 is, for example, an ink cartridge-integrated head in which ink cartridges (not illustrated in the drawings) corresponding to yellow (Y), magenta (M), and cyan (C) ink are formed integrally with an ink discharging area (not illustrated) provided on a surface (in the present embodiment, the bottom surface in FIG. 1A and the like) facing the drawing object (the nail T) in each of the ink cartridges.

The ink discharging area is provided with a nozzle array consisting of a plurality of nozzles for spraying each color of ink. The ink jet head 71 micronizes the ink and performs the drawing by spraying the ink from the ink discharging area directly on the target drawing surface of the drawing object (the nail T).

Note that the ink jet head 71 is not limited to those that discharge the three colors of ink described previously. Ink cartridges holding other ink and ink discharging areas may also be provided.

One pen 41 is mountable in the pen holder 42 of the present embodiment.

The pen 41 is a writing utensil that has the surface of the nail T as its drawing object surface, and performs a drawing by the tip portion thereof being brought into contact with the drawing object surface, namely the surface of the nail T.

The pen 41 is provided with the pen tip 413 on a tip side (the lower side in FIGS. 1A and 1B) of a rod-like pen shaft portion 411.

An interior of the pen shaft portion 411 is an ink storing portion for storing various types of ink.

Any type of ink can be stored in the interior of the pen shaft portion 411. Viscosity of ink, diameter of the coloring particles (particle size), and the like are not particularly limited and, for example, ink containing metallic glitter, white ink, UV-curable ink, ink for gel nails, ink for under coats, ink for top coats, nail varnish, and the like can be used.

In the present embodiment, the pen 41 is a ballpoint pen in which the pen tip 413 draws by the ink stored in the pen shaft portion 411 being dispensed by pressing the pen tip 413 against the surface of the nail T.

Note that the pen 41 is not limited to a ballpoint pen. For example, the pen 41 may be a felt-tip pen that draws by soaking ink into a felt-like pen tip, a brush pen that draws by soaking ink into a bundle of hairs, or the like.

The pen 41 having the pen tip 413 of any desired thickness may be provided as well.

The pen 41 is held by simply inserting it in the pen holder 42 from above. As such, the pen 41 can be easily replaced by opening the cover 23 provided in the case body 2 and, for example, using hands or tweezers to grab a top end portion of the pen shaft portion 411 and lifting the pen 41 out.

Thus, a user can realize a wide range of nail designs by appropriately replacing the pen 41 set in the pen holder 42 for a pen 41 having a different color or a different pen tip 413, or using a different type of ink, depending on the nail design desired to be drawn.

A mechanism for operating the pen 41 such as a pen vertical motor 426 (see FIG. 4) constituted by a stepping motor is provided in the vicinity of the pen holder 42. The pen 41 is configured to be movable in the vertical direction by the driving of this pen vertical motor 426.

The unit supporting member 44 is fixed to an X-direction movement device 451 that is attached to the X-direction movement stage 45.

The X-direction movement device 451 is configured to move on the X-direction movement stage 45 in the X direction along a guide (not illustrated) via the driving of the X-direction movement motor 46. Thus, the drawing head 43 that is attached to the unit supporting member 44 is configured to move in the X direction (the X direction in FIG. 1A and the left-right direction of the nail printing apparatus 1).

The X-direction movement stage 45 is fixed to a Y-direction movement device 471 of the Y-direction movement stage 47.

The Y-direction movement device 471 is configured to move on the Y-direction movement stage 47 in the Y direction along a guide (not illustrated) via the driving of the Y-direction movement motor 48. Thus, the drawing head 43 that is attached to the unit supporting member 44 is configured to move in the Y direction (the Y direction in FIG. 1B and the front-back direction of the nail printing apparatus 1).

Note that in the present embodiment, the X-direction movement stage 45 and the Y-direction movement stage 47 are configured from combinations of the X-direction movement motor 46, the Y-direction movement motor 48, and ball screws and guides (not illustrated).

In the present embodiment, a head movement device 49 is configured as an XY driver that drives the drawing head 43 provided with the pen 41 in the X direction and the Y direction via the X-direction movement motor 46, the Y-direction movement motor 48, and the like.

The pen vertical motor 426, the ink jet head 71, the X-direction movement motor 46, and the Y-direction movement motor 48 of the drawing mechanism 40 are connected to a drawing controller 816 of a control device 80 (see FIG. 4; described later), and are configured to be controlled by the drawing controller 816.

A drying mechanism 90 is disposed beside the drawing head 43.

In the present embodiment, the drying mechanism 90 is configured to be movable with the drawing head 43 by the head movement device 49.

Figure 4:
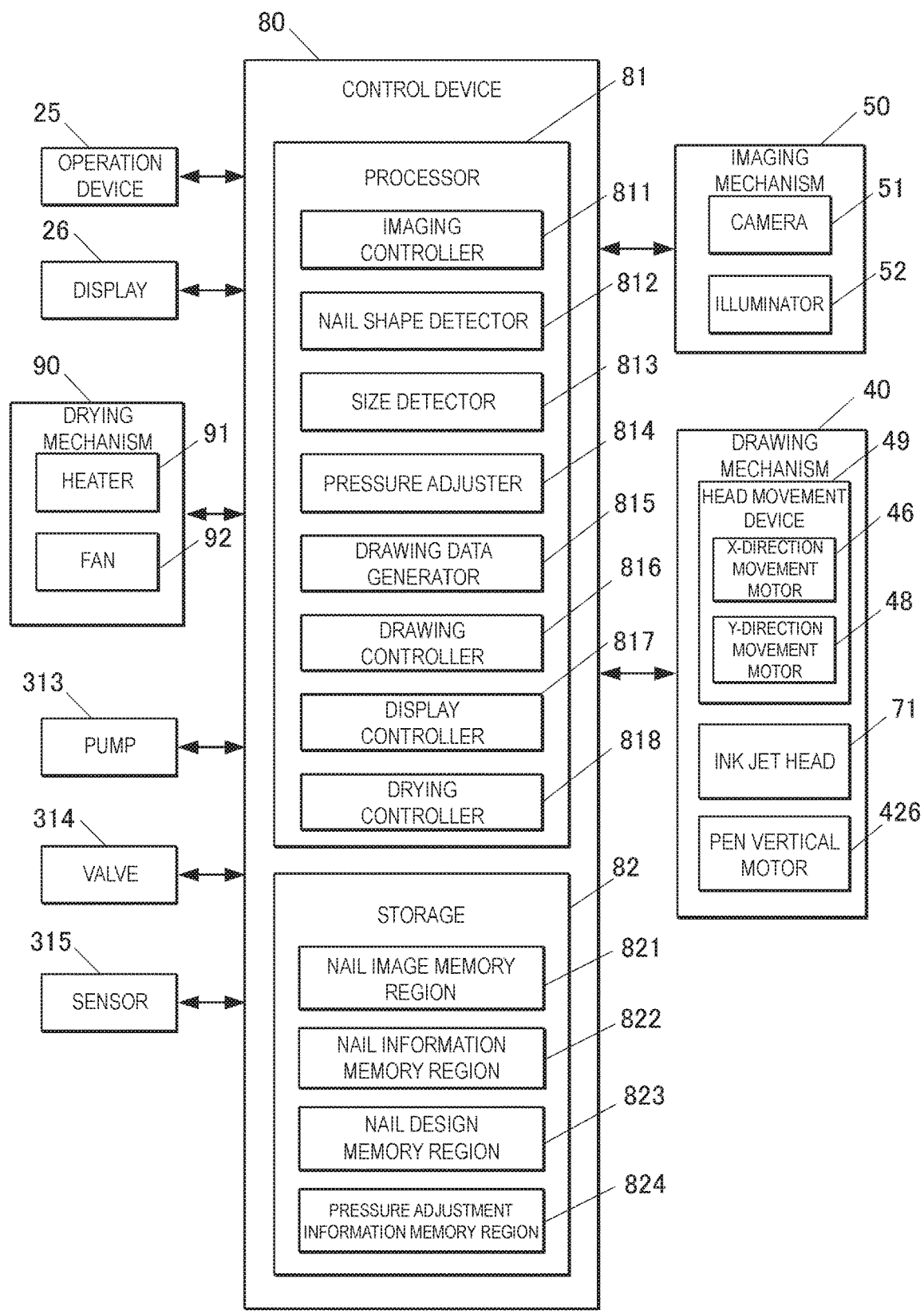
FIG. 4 is a main constituent block diagram illustrating a control configuration of a drawing apparatus according to the embodiment of the present invention.

The drying mechanism 90 includes a heater 91 (see FIG. 4) for generating heat and a fan 92 for blowing air (see FIG. 4). The drying mechanism 90 is capable of directing the wind generated by the fan 92 at the nail T of the print finger U1 placed in the finger receiver 31, and of drying the ink applied on the nail T by the ink jet head 71 and/or the ink applied on the nail T by the pen 41.

Note that it is preferable that the drying mechanism 90 have a configuration in which the heater 91 can be switched ON and OFF depending on the application, and the fan 92 can be rotated while the heater 91 is OFF.

As illustrated in FIGS. 1A and 1B, an imaging mechanism 50 is provided on a base plate 13 fixed to the upper frame 12. The imaging mechanism 50 is provided with a camera 51 and an illuminator 52.

Specifically, the base plate 13 is set on the upper frame 12, and two cameras 51 are set on a bottom surface of the base plate 13 at a position substantially above the finger receiver 31.

It is preferable that the camera 51 have, for example, no less than about 2 million pixels.

The imaging mechanism 50 illuminates the nail T of the print finger U1, which is inserted into the finger receiver 31 and is visible through the opening in the upper area (that is, the window area 311d), using the illuminator 52. Moreover, the print finger U1 is imaged using the cameras 51 and, captured images of the nail T of the print finger U1, namely nail images (images of the finger including nail images) are acquired.

One of the two cameras 51 is disposed at an orientation facing the bottom surface of the finger receiver 31, and images the nail T from directly above.

The other camera 51 is disposed at an orientation inclined with respect to the bottom surface of the finger receiver 31, and images the nail T from diagonally above.

Thus, the two cameras 51 are disposed at different positions/angles and, as a result, can image the nail T from at least two different positions/angles.

In the present embodiment, at least two nail images captured from different positions/angles are acquired by the two cameras 51 provided at different positions/angles.

Moreover, a nail shape detector 812 (described later) detects nail information such as a position of the nail T on the X-Y plane, an outline of the nail T (shape of the nail T), a curvature of the nail T (that is, the curved shape of the nail T), a vertical position of the nail T, and the like, on the basis of these captured images (nail images) acquired by the cameras 51. Note that, particularly, it is possible to accurately detect the curved shape of the nail T of the print finger U1 due to the fact that a plurality of the captured images (nail images) are acquired by imaging the nail T from different positions/angles.

A size detector 813 (described later) detects a size (in the present embodiment, a width of the print finger U1 as described later) of the print finger U1 inserted into the finger receiver 31, on the basis of these captured images (nail and finger images) that are acquired by at least one of the cameras 51.

The illuminator 52 is, for example, a white light emitting diode (LED) or similar light source.

In the present embodiment, the illuminator 52 is disposed on the base plate 13 in the vicinity of the cameras 51, and illuminates the nail T of the print finger U1 when imaging using the cameras 51.

Note that the specific disposal and number of the illuminator 52 provided, and the like are not limited to the examples illustrating in the drawings.

The imaging mechanism 50 is connected to an imaging controller 811 of the control device 80 (described later, see FIG. 4), and is configured to be controlled by the imaging controller 811.

Image data of the images captured by the imaging mechanism 50 are stored in a nail image memory region 821 (see FIG. 4) of a storage 82 (described later).

The control device 80 is, for example, arranged on a base plate 13 or the like disposed in the upper frame 12.

FIG. 4 is a main constituent block diagram illustrating the control configuration according to the present embodiment.

As illustrated in FIG. 4, the control device 80 is a computer provided with a processor 81 constituted by a central processing unit (CPU) (not illustrated), and a storage 82 constituted by read only memory (ROM), random access memory (RAM), or the like (neither illustrated).

Various programs to operate the nail printing apparatus 1, various data, and the like are stored in the storage 82.

Specifically, various programs are stored in the ROM of the storage 82 such as a nail information detection program for detecting the shape (outline), the curved shape in the width direction, the width and length of the nail, and other nail information of the nail T from the nail images (captured images); a finger size detection program for detecting the size of the print finger U1 from the nail images (captured images); a pressure adjusting program for adjusting the internal pressure of the finger fixing member 312; a drawing data generation program for generating drawing data; a drawing program for performing drawing processing; and the like. These programs are executed by the control device 80 and, thus, the components of the nail printing apparatus 1 are controlled in an integrated manner.

In the present embodiment, the storage 82 is provided with the nail image memory region 821 where the nail images (captured images) of the nail T of the print finger U1 of a user acquired by the imaging mechanism 50 are stored; a nail information memory region 822 where the nail information detected by the nail shape detector 812 (the shape/outline of the nail T, the curvature of the nail T, and the like) is stored; a nail design memory region 823 where image data of a nail design to be drawn on the nail T is stored; a pressure adjustment information memory region 824 needed for the pressure adjustment processing of the finger fixing member 312; and the like.

A table or the like that defines correspondence between finger width sizes (or finger width levels that are the results of level sorting according to finger width sizes) and pressure levels is stored in a pressure adjustment information memory region 825.

Pressure levels (specifically, pressure values; unit: mmHg) are set in this table such that the internal pressure of the finger fixing member 312 increases as the finger width decreases.

For example, in a case where classified into the three finger width levels of large, medium, and small according to the finger width size, correspondence such as the following is set in the table. For example, a pressure level where the internal pressure of the finger fixing member 312 is 200 mmHg is set and the print finger U1 is prevented from moving for a print finger U1 having the smallest finger width level classification, namely "size 1"; a pressure level where the internal pressure of the finger fixing member 312 is 150 mmHg is set and the print finger U1 is prevented from moving for a print finger U1 having a finger width level classification of "size 2"; and a pressure level where the internal pressure of the finger fixing member 312 is 100 mmHg is set and the print finger U1 is prevented from moving for a print finger U1 having the largest finger width level classification, namely "size 3."

Note that the pressure levels corresponding to each of the finger width levels are not limited to the examples described herein and can be adjusted as deemed appropriate.

The classification of the finger width levels is not limited to three levels, and more detailed classification is possible.

Thresholds for classifying into a plurality of finger width levels according to finger width sizes are appropriately set.

When viewed from a function perspective, the processor 81 is provided with the imaging controller 811, the nail shape detector 812, the size detector 813, the pressure adjuster 814, a drawing data generator 815, the drawing controller 816, a display controller 817, a drying controller 818, and the like. Functions of the imaging controller 811, the nail shape detector 812, the size detector 813, the pressure adjuster 814, the drawing data generator 815, the drawing controller 816, the display controller 817, the drying controller 818, and the like are realized by cooperation of the CPU of the processor 81 and the programs stored in the ROM of the storage 82.

The imaging controller 811 is configured to cause the camera 51 to image finger images, that is, nail images (captured images) including images of the nail T of the print finger U1 inserted into the finger receiver 31, by controlling the camera 51 and the illuminator 52 of the imaging mechanism 50.

In the present embodiment, the imaging controller 811 causes the two cameras 51 to image the nail T from a plurality of positions or angles in the width direction of the nail T (e.g. directly above the nail T and diagonally above the nail T, or the like), and acquire a plurality of the nail images (captured images).

Note that the number of captured images acquired for one nail T is not particularly limited, but it is preferable that two or more captured images be acquired from different positions in the width direction of the nail T because it will be possible to perform accurate detection, including the detection of the curvature of the nail T.

The image data of the nail image acquired by the imaging mechanism 50 are stored in the nail image memory region 821 of the storage 82.

The nail shape detector 812 is configured to detect the nail information on the nail T of the print finger U1 on the basis of the images (captured images) of the nail T of the print finger U1 inserted into the finger receiver 31, the image being imaged by the camera 51.

In the present embodiment, the nail shape detector 812 detects, on the basis of the captured images, for example, the shape (outline) of the nail T, the X-Y coordinates of the horizontal position of the nail T, the height of the nail T (position in the vertical direction of the nail T, hereinafter referred to as the "vertical position of the nail T" or simply the "position of the nail T"), the shape in the width direction of the nail T, that is, the inclination angle with respect to the X-Y plane of the surface of the nail T (the curvature of the nail T or the inclination angle of the nail T), and the like. Note that the detail detected by the nail shape detector 812 is not limited to such attributes.

The nail information acquired by the nail shape detector 812 is stored in the nail information memory region 822 of the storage 82.

The size detector 813 detects the size of the print finger U1 inserted into the finger receiver 31 from the images (captured images) of the print finger U1 imaged by the cameras 51.

In the present embodiment, the size detector 813 detects the finger width as the size of the print finger U1.

The size detector 813 may classify the detected finger width of the print finger U1 into a plurality of levels (that is, for example, size 1 to size 3).

Examples of methods for detecting finger width by the size detector 813 include detecting a lateral width of the print finger U1 at a center portion in the length direction of the nail T as the finger width.

Note that a portion where the lateral width of the print finger U1 is taken and used as the finger width is not limited to the center portion. Any portion that can be imaged by the imaging mechanism 50, that is, the lateral width of any portion that is exposed through the window area 311d can be detected as the finger width.

The pressure adjuster 814 is a finger holding adjuster that adjusts the holding level by the finger fixing member 312 at the time of holding the print finger U1, in accordance with the size of the print finger U1 detected by the size detector 813.

In the present embodiment, the pressure adjuster 814 adjusts the internal pressure of the finger fixing member 312 at the time of holding the print finger U1, in accordance with the size of the print finger U1 detected by the size detector 813.

Specifically, the pressure adjuster 814 reads the pressure level (that is, the pressure value) corresponding to the finger width size (or the finger width level), which has been detected by the size detector 813, by referencing the table indicating the correspondence between the finger width sizes (or the finger width levels) and the pressure levels (that is, the pressure values), and sets this pressure level (that is, pressure value) as the internal pressure value of the finger fixing member 312 for holding the print finger U1.

Then, the pressure adjuster 814 controls the pump 313 and the valve 314 and places the finger fixing member 312 in an expanded state by appropriately injecting a fluid, namely air, into the finger fixing member 312 until the set internal pressure is reached.

Detection results are appropriately sent from the sensor 315, which detects the internal pressure of the finger fixing member 312, to the pressure adjuster 814; and when the pressure adjuster 814 determines from these detection results that the internal pressure value of the finger fixing member 312 has reached the set level, the pressure adjuster 814 halts the injection of the air by the pump 313.

When the drawing operation on the print finger U1 by the pen 41 or the ink jet head 71 is complete, the pressure adjuster 814 causes the valve 314 to open, the air within the finger fixing member 312 to be discharged, and the internal pressure of the finger fixing member 312 to lower so as to place the finger fixing member 312 in a contracted state.

The drawing data generator 815 generates drawing data for the drawing to be performed by the drawing head 43 to the nail T of the print finger U1 on the basis of the nail information detected by the nail shape detector 812.

Specifically, on the basis of the shape of the nail T (contour shape) and the like detected by the nail shape detector 812, the drawing data generator 815 performs calibration processing, such as enlarging, reducing, and cropping, for calibrating the image data of the nail design to the shape of the nail T.

The drawing data generator 815 functions as an image data correction device that performs appropriate curvature correction on the image data of the nail design specified to be drawn on the nail T, in accordance with the curvature of the nail T detected by the nail shape detector 812.

As a result, drawing data for the nail design to be drawn by the pen 41 or the ink jet head 71 is generated.

The drawing controller 816 outputs control signals to the drawing mechanism 40 on the basis of the drawing data generated by the drawing data generator 815, and controls the X-direction movement motor 46, the Y-direction movement motor 48, the pen vertical motor 426, the ink jet head 71, and the like of the drawing mechanism 40, so as to perform a drawing on the nail T that corresponds with the drawing data.

Specifically, the drawing controller 816 controls the operations of the pen vertical motor 426 such that, when the pen 41 is not drawing, a state is held in which the tip portion (the pen tip 413) of the pen 41 is raised to a height at which the pen tip 413 is not in contact with the surface of the nail T; and when drawing, the tip portion (the pen tip 413) of the pen 41 is lowered to a height at which the pen tip 413 contacts the surface of the nail T. Then, the drawing controller 816 sequentially performs drawing at predetermined positions on the nail T while causing the drawing head 43 to move in the X-direction and the Y-direction by causing the X-direction movement motor 46 and the Y-direction movement motor 48 to appropriately operate.

The display controller 817 is configured to control the display 26 and cause the display 26 to display various types of display screens. In the present embodiment, examples of the various types of display screens the display controller 817 is configured to display on the display 26 include nail design selection screens and thumbnail images for confirming designs, nail images acquired by imaging the print finger U1, various command screens, operation screens, and the like.

The drying controller 818 controls the drying operation by the drying mechanism 90 and causes drying processing by the drying mechanism 90 to be performed on the nail T inserted into the finger receiver 31 on which the drawing has been performed.

Specifically, the drying controller 818 appropriately switches the heater 91 and the fan 92 of the drying mechanism 90 ON and OFF. The drying controller 818 is configured to appropriately perform temperature control of the heater 91 and, as necessary, is capable of turning the heater 91 OFF and only causing the fan 92 to operate.

Next, operations of the finger holding member 35 and the nail printing apparatus (drawing apparatus) 1 of the present embodiment will be described while referencing FIGS. 5A, 5B, and 9.

When performing drawing using the nail printing apparatus 1, the user first spreads the portion of the slit 354 provided on the top side of the finger insertion tool 351 of the finger holding member 35 outward a degree whereby it is possible to insert the print finger U1, and inserts a finger (the print finger U1) of the drawing object, namely the nail T, into the finger holding member 35, as illustrated in FIGS. 5A and 5B.

Then, the user positions the nail T such that the nail T is exposed through the opening region 351c and, furthermore, mounts the free edge portion of the nail T on the nail mount portion 353.

Next, after the user has set the print finger U1 within the finger holding member 35 as described above, the user wraps the belt member 355 along the outer periphery of the finger insertion tool 351 so as to close the slit 354, as illustrated in FIG. 6.

Figure 7:
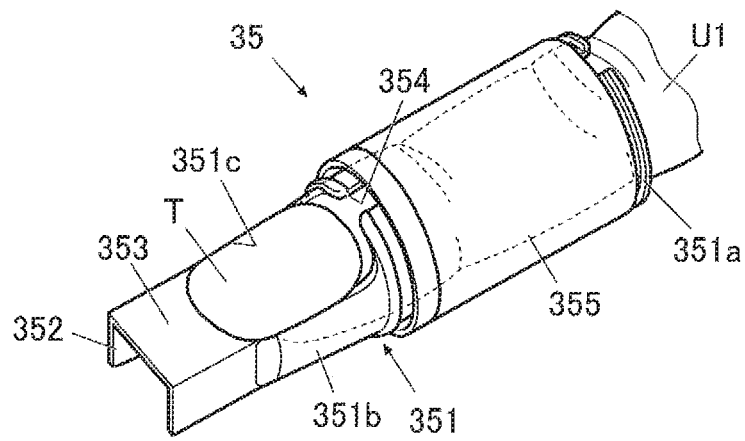
FIG. 7 is a perspective view illustrating a state in which the print finger is inserted into the finger holding member.

As a result, the setting of the print finger U1 in the finger holding member 35 is completed (see FIG. 7).

Figure 8:
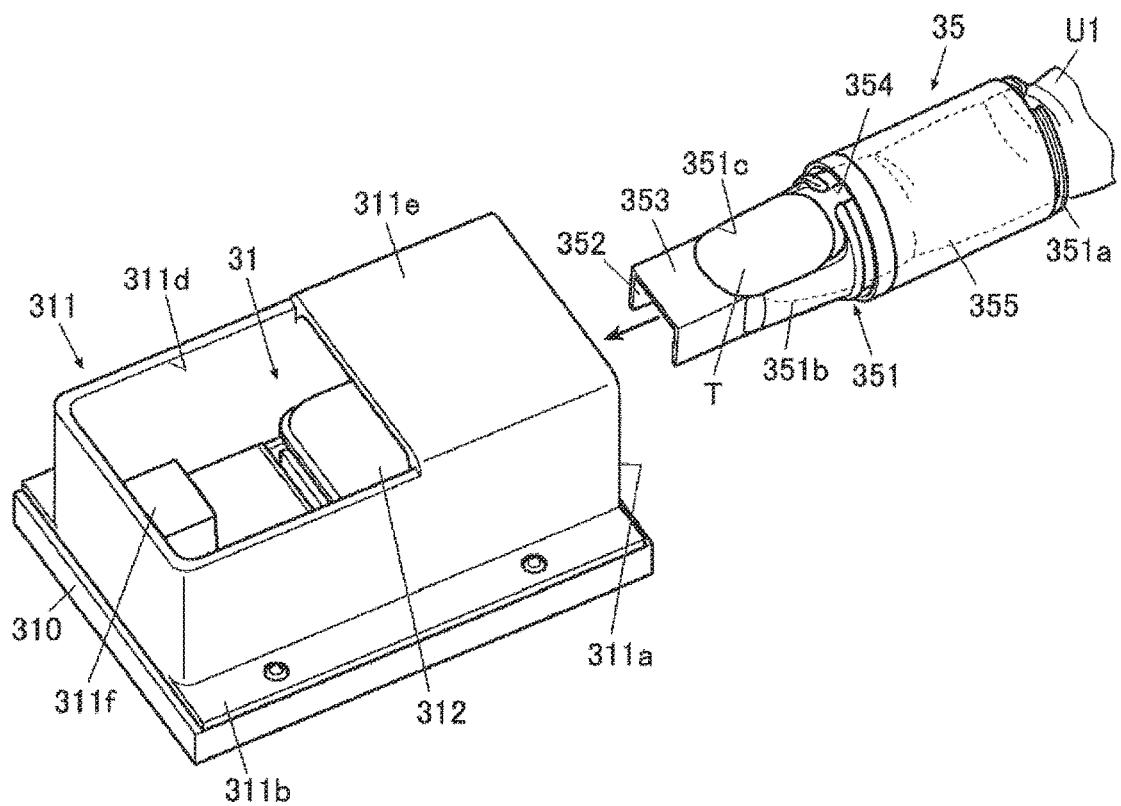
FIG. 8 is a perspective view illustrating a situation of inserting the finger holding member having the print finger inserted thereto into the finger receiver.

Next, as illustrated in FIG. 8, while the print finger U1 is set, the user inserts the finger holding member 35 into the finger receiver 31 (the finger holding case 311 within the finger receiver 31) along the extending direction of the print finger U1, that is, the print finger insertion direction, and disposes the finger holding member 35 within the finger receiver 31.

Figure 9:
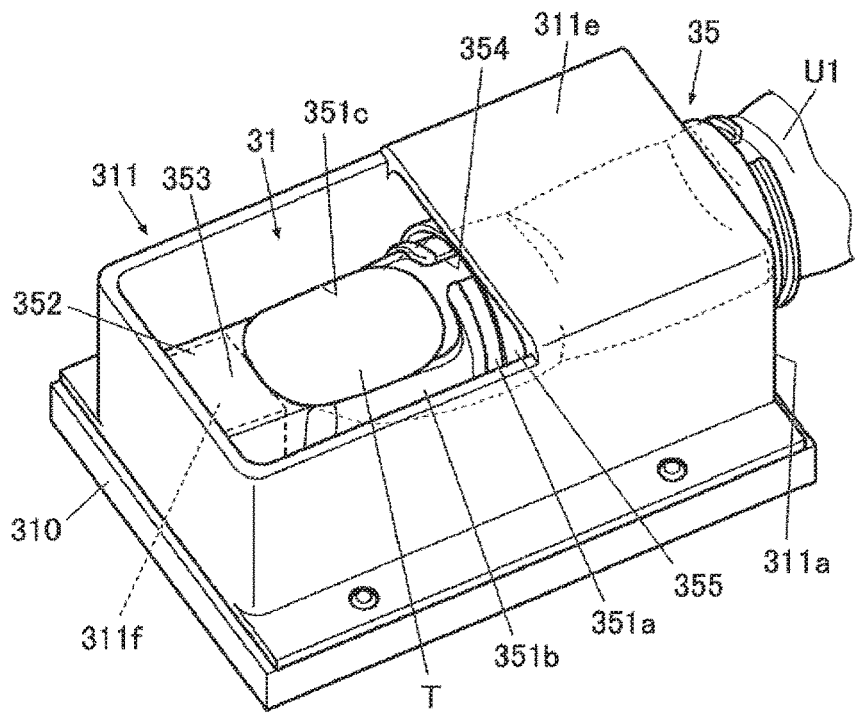
FIG. 9 is a perspective view illustrating a state in which the finger holding member having the print finger inserted thereto has been inserted into the finger receiver.

Then, as illustrated in FIG. 9, the connector 352 of the finger holding member 35 is fitted from above and coupled with the apparatus side connector 311f provided at the back side within the finger receiver 31.

As a result, the nail T is exposed through the window area 311d and is positioned at a position suitable for drawing.

Next, the user operates a power switch to turn on the control device 80.

The display controller 817 displays a design selection screen on the display 26.

The user operates operation buttons or the like on the operation device 25 and selects a desired nail design from among a plurality of nail designs displayed on the design selection screen.

As a result, a selection command signal is output from the operation device 25 and the nail design intended to be drawn on the nail T is selected.

Upon operation by the user of a drawing switch (not illustrated) of the operation device 25, a drawing command is input into the control device 80 from the drawing switch.

Upon input of the drawing command and before starting the drawing operations, first, the imaging controller 811 controls the cameras 51 and the illuminator 52 of the imaging mechanism 50 and causes the camera 51 to image the print finger U1, and acquire nail images (captured images).

Then, upon acquisition of the captured images, the size detector 813 detects the finger width as the size of the print finger U1, on the basis of the captured images.

The size detector 813 may further categorize the detected finger width into a plurality of finger width levels.

Upon acquisition of the finger width (or the classification results of the finger width level) of the print finger U1 by the size detector 813, the pressure adjuster 814 references the table or the like in which the correspondence between the finger widths (or the classification results of finger width levels) and the pressure values (the pressure levels) is defined, and sets the internal pressure value of the finger fixing member 312 to prevent the print finger U1 from moving.

Then, the pressure adjuster 814 causes the pump 313 to operate and begin injection of air into the finger fixing member 312 and also acquires the internal pressure value of the finger fixing member 312 from the sensor 315.

The pressure adjuster 814 constantly determines whether or not the pressure value is the set level and, when determined that the pressure value has reached the set level, causes the pump 313 to stop injecting air into the finger fixing member 312.

At this time, the finger fixing member 312 is in a satisfactory expanded state corresponding to the size of the print finger U1, and the print finger U1 is prevented from moving at a position suitable for performing drawing on the nail T.

Upon acquisition of the nail images (the captured images), the nail shape detector 812 detects the outer shape, namely the contour shape, of the nail T on the basis of the nail images (the captured images).

The nail shape detector 812 detects the curvature of the nail T and other nail information on the basis of the nail images (the captured images).

Next, the drawing data generator 815 generates drawing-use data (drawing data of a nail design) for drawing a nail design selected by the user on the nail T of the user, on the basis of the nail information detected by the nail shape detector 812.

Upon generation of the drawing-use data, the drawing controller 816 exports the drawing-use data to the drawing mechanism 40 and causes the head movement device 49 to operate and perform drawing processing for performing various types of drawings on the nail T using the pen 41 and/or the ink jet head 71 while appropriately moving the drawing head 43.

Upon completion of the drawing processing, the drying controller 818 controls the operations of the drying mechanism 90 and causes drying processing for drying the ink applied to the nail T to be performed.

The pressure adjuster 814 determines whether or not the drawing processing on the nail T of the print finger U1 and the drying processing has finished and, in cases where it is determined that the drawing processing and the drying processing has not finished, the pressure adjuster 814 maintains the internal pressure of the finger fixing member 312 at the predetermined pressure value.

On the other hand, in cases where it is determined that the drawing processing and the drying processing has finished, the pressure adjuster 814 causes the valve 314 to open thereby discharging the air in the finger fixing member 312 and lowering the finger fixing member 312 to a contracted state.

As a result, the finger mounting stand 36 is placed in a state in which the holding is released and, in this state, the user can remove the print finger U1 from the finger receiver 31.

In this state, the user removes the print finger U1 from the finger receiver 31. Then, the user detaches the belt member 355 of the finger holding member 35 and removes the print finger U1 through the slit 354.

As a result, the nail T can be positioned at an appropriate position, high-definition drawing can be performed while the nail T is fixed, and hygienic and safe nail printing can be performed without the skin portion and the like of the print finger U1 becoming dirtied or stained or the finger and/or nail directly touching the interior of the apparatus.

As described above, according to the present embodiment, drawing processing can be performed while the print finger U1 is held in the finger holding member 35 that includes the finger insertion tool 351 configured such that the print finger U1 can be inserted through the slit 354 formed in a portion of the peripheral surface; the connector 352 provided continuously with the tip side of the print finger U1 in the finger insertion tool 351, and coupled with the apparatus side connector 311f of the nail printing apparatus 1; and the nail mount portion 353 on which the nail T of the print finger U1 inserted into the finger insertion tool 351 is mounted.

Thus, the connector 352 can be coupled with the apparatus side connector 311f and the nail T of the print finger U1 can be positioned by simply setting the print finger U1 in the finger holding member 35 and inserting the finger holding member 35 into the finger receiver 31. As such, the nail T of the print finger U1 can be disposed at a position suitable for drawing in a simple, quick, and reliable manner.

Particularly, when the nail printing apparatus 1 is used in a nail salon or the like, compliance with the Beautician's Act, Barber's Act, and the like is required. The Beautician's Act and Barber's Act stipulate that when a beautician or barber performs beautification or barber services, any pieces of cloth that come into contact with the skin must be changed for each customer, and that equipment that comes into contact with the skin must be disinfected for each customer (see Beautician's Act, Article 8; Barber's Act, Article 9).

Here, if drawing processing is performed while the print finger U1 is set in the finger holding member 35, the print finger U1 and/or the nail T will not directly contact the interior of the apparatus. As such, the labor involved with cleaning and disinfecting the interior of the apparatus for each customer can be omitted. Note that, when using the nail printing apparatus 1 in such an environment, the finger holding member 35 is disposed of for each customer (or for each print finger U1).

The finger portion (skin of the finger) is housed within the finger insertion tool 351 and, as such, safe and hygienic drawing processing can be performed without ink adhering to the finger portion (skin of the finger), even if ink spattering and/or drawing position deviation occurs when drawing.

Particularly, in the present embodiment, the slit 354 of the finger holding member 35 is provided on the top side of the finger insertion tool 351 and, as such, there is little risk of the surface of the nail T being rubbed by the finger holding member 35 when removing the print finger U1 from the finger holding member 35 after the drawing processing, and the finger holding member 35 can be neatly removed without damaging the nail print.

At least the finger insertion tool 351 is formed from a soft elastomer or similar soft material. Due to the finger insertion tool 351 being formed from a soft material with good elasticity, the finger can be inserted smoothly when setting the print finger U1 in the finger holding member 35.

As elastomers and the like have elasticity, the finger holding member 35 more easily fits the print finger U1 and, furthermore, adapts to the skin better. Therefore, there is less possibility of causing pain, discomfort, and the like to the user.

Due to the fact that the print finger U1 is surrounded by a soft material, there will be only a small load applied when holding the print finger U1 in the finger receiver 31, and the print finger U1 can be prevented from moving without the user feeling pain.

Furthermore, the finger fixing member 312, which is formed from an elastomer or the like, is provided within the finger receiver 31 as in the present embodiment, and the print finger U1 is inserted while held in the finger holding member 35, which is formed from the same elastomer or similar soft material. In this case, components formed from the same material contact each other, resulting in good adhesion therebetween. As a result, deviation and/or movement of the print finger U1 can be suppressed.

The finger holding member 35 of the present embodiment includes the belt member 355 that is wrapped along the outer periphery of the finger insertion tool 351 after the print finger U1 has been inserted and closes the slit 354.

As such, the print finger U1 can be reliably held in the finger holding member 35 without the print finger U1 falling out of the finger holding member 35 or becoming displaced.

Also, in the present embodiment, the belt member 355 is integrally formed with the outside of the finger insertion tool 351. As such, the finger holding member 35 can be manufactured by integral molding including the belt member 355, and the productivity of the finger holding member 35 can be improved.

In the nail printing apparatus 1, when positioning the print finger U1 using the finger holding member 35 described above and performing drawing, the nail T of the print finger U1 can be disposed at a position suitable for drawing in a simple, quick, and reliable manner.

Particularly, when using the nail printing apparatus 1 in a nail salon or the like, the print finger U1 and the like does not directly touch the apparatus and, as such, the drawing processing can be performed in a safe and hygienic manner. Moreover, the labor involved with cleaning and disinfecting the apparatus can be omitted while complying with the Beautician's Act and Barber's Act.

In the present embodiment, the finger fixing member 312 that prevents the print finger U1 held in the finger holding member 35 from moving is provided within the finger receiver 31.

As such, the print finger U1 can be reliably fixed, the nail T of the print finger U1 can be disposed at a height position suitable for drawing, and high-definition drawing can be safely performed.

In the present embodiment, the size detector 813 that detects the size of the print finger U1 inserted into the finger receiver 31, and the pressure adjuster 814 that adjusts the holding level by the finger fixing member 312 at the time of holding the print finger U1, in accordance with the size of the print finger U1 detected by the size detector 813 are provided.

As such, the print finger U1 can be fixed with suitable squeezing when drawing on the nail T of a finger of any size. Moreover, the holding of the print finger U1 can be satisfactorily performed without the print finger U1 moving during drawing to cause deviation of the drawing position, and also without squeezing too much and inflicting pain, discomfort, or the like on the print finger U1.

The embodiment described above is for the purpose of elucidating the present invention and is not to be construed as limiting the present invention. The invention can of course be altered and improved without departing from the gist thereof.

For example, in the present embodiment, an example has been given of a case where the slit 354 of the finger holding member 35 is provided on the top side of the finger insertion tool 351, but the position where the slit 354 is provided is not limited thereto.

For example, configurations are possible where the slit 354 is provided on the bottom side of the finger insertion tool 351, and where the slit 354 is provided in the side surface of the finger insertion tool 351 and the print finger U1 is inserted by sliding from the side.

Particularly, in cases where the slit 354 is provided on the bottom side of the finger insertion tool 351, when a slender print finger U1 is inserted into the finger holding member 35, it is easier to dispose the nail T at a position matching the opening region 351c due to the print finger U1 being inserted from the bottom side.

In the present embodiment, an example has been given of a case where the belt member 355 is formed integrally with the finger holding member 35 and formed from the same material as the finger holding member 35. However, a configuration is possible in which the belt member 355 is formed from a different material than the finger insertion tool 351. Another configuration is possible in which the belt member 355 is formed as a separate member from the finger insertion tool 351.

For example, a configuration is possible in which the slit 354 is closed and the print finger U1 is held by wrapping a surface fastener or the like as the belt member on the peripheral surface of finger insertion tool 351.

Furthermore, a configuration is possible in which the belt member 355 is not provided. In this case, for example, a hook or the like may be provided on one side of the slit 354 and an engaging area that receives the hook or the like may be provided on the other side of the slit 354; and the gap of the slit 354 may be closed by engaging the hook or the like with the engaging area.

A plurality of types of the finger holding member 35 may be prepared for respective finger types and/or sizes. For example, finger holding members 35 of differing thicknesses may be prepared. Examples thereof include finger holding members 35 for slender fingers such as little fingers, for fingers of medium thickness such as middle fingers, for fingers of large thickness such as thumbs, and the like.

In this case, the feeling of fit can be improved by selecting and using the finger holding member 35 that matches the finger of the nail T on which the user intends to draw.

In the present embodiment, an example has been given of a case where, in the nail printing apparatus 1, one finger fixing member 312 is disposed only on the bottom surface of the finger receiver 31. However, the characteristics, such as the shape and configuration, of the finger fixing member 312 are not limited to the examples described herein.

For example, a portion or all of the finger fixing member 312 may be disposed so as to be stacked in a plurality of stages.

The finger fixing member 312 may be formed such that two blocks are coupled at roughly the center in the width direction within the finger receiver 31, and disposed within the finger receiver 31. In this case, in the expanded state where the internal pressure is increased, the finger fixing member 312 substantially has a V-shape and can prevent the print finger U1 from moving via the finger holding member 35 by sandwiching the print finger U1 from below.

The finger fixing member 312 may be a linked member formed such that, when in the expanded state where the internal pressure is increased, a cross-section thereof substantially has a vertical or horizontal U-shape. In this case as well, the finger fixing member 312 can prevents the print finger U1 from moving from three directions, namely the bottom side and both side surfaces, via the finger holding member 35.

Finger holding members may be disposed on both side surfaces of the finger receiver 31 in addition to the bottom surface of the finger receiver 31. In this case, the plurality of finger holding members are coupled in a state in which inflow and outflow of fluid is possible (that is, in a state where at least partly in communication), and may be configured such that the expansion adjusting can be performed with a single pump or the like.

Note that the shape and configuration of the finger fixing member 312 are not limited to the examples described herein, and any appropriate shape or configuration may be used.

In the present embodiment, the sensor 315 that detects the internal pressure of the finger fixing member 312 is provided. However, the sensor 315 that detects the internal pressure of the finger fixing member 312 is not an essential component. For example, a configuration is possible in which a pressure sensor and/or touch sensor is provided on the inside surface of the finger holding portion 311e, the pressure sensor and/or touch sensor is capable of detecting that the top surface of the print finger U1 has contacted the inside surface of the finger holding portion 311e, and the pump 313 is caused to stop injecting air into the finger fixing member 312 at the point when contact of the top surface of the print finger U1 with the inside surface of the finger holding portion 311e is detected.

When such a configuration is used, it is not necessary to control the inner pressure in accordance with the size of the finger, thus allowing the size detector 813 to be omitted.

In the present embodiment, an example has been given of a case where the finger fixing member 312 prevents a finger from moving by adjusting the internal pressure. However, the method whereby the finger fixing member 312 prevents a finger from moving is not limited to the examples described herein.

For example, a configuration is possible in which a finger mount stand that lifts and lowers via a solenoid or similar actuator is provided within the finger receiver 31, and the print finger U1 is prevented from moving by being sandwiched between this stand and the finger holding portion 311e of the finger holding case 311.

In this case, the finger size may be detected as in the present embodiment, and the height level to which the finger mount stand is lifted or lowered may be controlled in accordance with the detection results.

As described above, a configuration is possible in which a pressure sensor and/or touch sensor is provided on the inside surface of the finger holding portion 311e, and the lifting of the finger mounting stand is caused to stop at the point when contact of the top surface of the print finger U1 with the inside surface of the finger holding portion 311e is detected. In this case as well, control according to the size of the finger is not necessary, thus allowing the size detector 813 to be omitted.

In the embodiment described above, a configuration has been described in which the drawing head 43 of the nail printing apparatus (the drawing apparatus) 1 is provided with the pen holder 42 that holds the pen 41 and the ink jet head 71 for drawing. However, both the pen 41 and the ink jet head 71 being provided is not an essential configuration feature and a drawing apparatus provided with either the pen 41 or the ink jet head 71 to perform drawing is possible.

In the embodiment described above, an example has been given of a case where the drawing head 43 is provided with one pen holder 42. However, the number of the pen holders 42 provided in the drawing head 43 is not limited to one. For example, a configuration is possible in which two or more pen holders 42 are provided and two or more pens 41 for drawing are held.

In the embodiment described above, an example has been given of a case where a user manually replaces the pen 41 held by the pen holder 42 as necessary. However, a configuration is possible in which a waiting space is provided where the pens 41 stand by in a home area 60 or the like, and the required pen 41 is automatically acquired from the waiting space and inserted into the pen holder 42 by a pen replacing mechanism (not illustrated in the drawings).

In the embodiment described above, an example has been given of a case where the camera 51 and the illuminator 52 are fixedly disposed on the upper area of the apparatus. However, positions at which the camera 51 and the illuminator 52 are provided are not limited to the upper area.

For example, a configuration is possible in which the cameras 51 and the illuminator 52 are mounted on the drawing head 43, and are movable in the X-Y directions by the head movement device 49.

For example, a mechanism for moving the imaging mechanism 50 may be provided separately from the mechanism for moving the drawing head 43.

Thus, in cases where configuring the cameras 51 and the illuminator 52 to be movable, a configuration is possible in which only one camera 51 is provided and imaging is performed from a plurality of different positions and/or angles by moving the camera 51.

In the embodiment described above, an example of the nail printing apparatus 1 in which one finger at a time is inserted and successive drawing is performed. However, a configuration is possible in which drawing is performed consecutively on a plurality of fingers without inserting and removing each finger.

The embodiment described above is not to be construed as limiting the scope of the present invention and includes the scope of the invention recited in the claims and equivalents.

The invention claimed is:

1. An object holding member comprising:
an object insertion tool; and
a connector;
wherein:
the object holding member is disposed within an external apparatus;
the object insertion tool has a space into which an object being a finger or a toe having a nail is insertable;
the connector is configured to couple with the external apparatus and suppress a change in a position of the object holding member within the external apparatus, in a case where the object holding member is disposed in the external apparatus;
a slit is formed in a portion of a peripheral surface of the object insertion tool; and
the slit is formed so as to allow insertion of the object into the object insertion tool and removal of the object inserted into the object insertion tool out of the object insertion tool.

2. The object holding member according to claim 1, wherein:
the external apparatus includes an apparatus side connector at a location where the connector couples; and
the connector is shaped to fit into the apparatus side connector.

3. The object holding member according to claim 1, wherein:
the slit is formed along an insertion direction of the object to the object insertion tool.

4. The object holding member according to claim 1, further comprising:
a belt member configured to wrap along an outer periphery of the object insertion tool and close the slit.

5. The object holding member according to claim 4, wherein:
the belt member is integrally formed with the object insertion tool on an outer side of the object insertion tool.

6. The object holding member according to claim 1, wherein:
the object insertion tool includes an opening region through which the nail is exposed while the object is inserted in the object insertion tool.

7. The object holding member according to claim 6, wherein:
the slit is formed at a position that leads to the opening region.

8. The object holding member according to claim 7, wherein:
the object insertion tool is formed from a soft material capable of being deformed by a user; and
insertion of the object into the object insertion tool and removal of the object inserted into the object insertion tool out of the object insertion tool is enabled due to the portion where the slit is formed in the object insertion tool being widened by the user.

9. A drawing apparatus comprising:
an object holding member including a connector and an object insertion tool, the object insertion tool having a space into which an object being a finger or a toe having a nail is insertable;
an object receiver in which the object holding member is disposed; and
a drawing mechanism configured to perform a drawing operation on the nail of the object inserted into the object holding member disposed within the object receiver;
wherein:
the object receiver includes an apparatus side connector configured to couple with the connector and suppress a change in a position of the object holding member within the object receiver, in a case where the object holding member is disposed in the object receiver;

the object holding member includes a slit formed in a portion of a peripheral surface of the object insertion tool; and the slit is formed so as to allow insertion of the object into the object insertion tool and removal of the object inserted into the object insertion tool out of the object insertion tool.

10. The drawing apparatus according to claim 9, wherein: the connector is shaped to fit into the apparatus side connector.

11. The drawing apparatus according to claim 9, wherein: the slit is formed along an insertion direction of the object to the object insertion tool.

12. The drawing apparatus according to claim 9, further comprising:
a belt member configured to wrap along an outer periphery of the object insertion tool and close the slit.

13. The drawing apparatus according to claim 12, wherein:
the belt member is integrally formed with the object insertion tool on an outer side of the object insertion tool.

14. The drawing apparatus according to claim 9, wherein:
the object insertion tool includes an opening region through which the nail is exposed while the object is inserted in the object insertion tool.

15. The drawing apparatus according to claim 14, wherein:
the slit is formed at a position that leads to the opening region.

16. The drawing apparatus according to claim 15, wherein:
the object insertion tool is formed from a soft material capable of being deformed by a user; and
insertion of the object into the object insertion tool and removal of the object inserted into the object insertion tool out of the object insertion tool is enabled due to the portion where the slit is formed in the object insertion tool being widened by the user.

17. The drawing apparatus according to claim 9, further comprising:
an object fixing member preventing the object holding member disposed within the object receiver from moving.

18. The drawing apparatus according to claim 17, further comprising:
a processor;
wherein the processor is configured to:
detect a size of the object based on a captured image of the object inserted into the object holding member; and
in accordance with the size of the object that has been detected, adjust a holding level of the object by the object fixing member at a time of holding the object.

* * * * *